United States Patent [19]

Urakami

[11] Patent Number: 4,926,957
[45] Date of Patent: May 22, 1990

[54] DEVICE CAPABLE OF SUCTION-ADHERING TO A WALL SURFACE AND MOVING THEREALONG

[76] Inventor: Fukashi Urakami, 5-21-204 Konandai 4-chome, Konan-ku, Yokohama, Japan

[21] Appl. No.: 174,404

[22] Filed: Mar. 25, 1988

[30] Foreign Application Priority Data

Apr. 10, 1987 [JP] Japan ................................. 62-80320

[51] Int. Cl.$^5$ ............................................. B60B 39/00
[52] U.S. Cl. ...................................... 180/164; 51/273; 114/222; 180/127; 180/901; 248/206.4
[58] Field of Search ................. 180/164, 901, 8.1, 8.5, 180/127; 114/222; 248/205.9, 206.4, 362, 363; 57/273; 446/178, 179

[56] References Cited

U.S. PATENT DOCUMENTS

| | | | |
|---|---|---|---|
| 2,815,919 | 12/1957 | Pribil | 248/363 |
| 3,495,358 | 2/1970 | Riedi | 51/273 |
| 3,892,287 | 7/1975 | Bennett | 180/164 |
| 4,095,378 | 6/1978 | Urakami | 180/901 |
| 4,193,469 | 3/1980 | Graf | 180/164 |
| 4,688,289 | 8/1987 | Urakami | 114/222 |

FOREIGN PATENT DOCUMENTS 26173 2/1987 Japan ................................. 180/164

Primary Examiner—Charles A. Marmor
Assistant Examiner—Eric Culbreth
Attorney, Agent, or Firm—Beveridge, DeGrandi & Weilacher

[57] ABSTRACT

A device comprising a main body, a motor and drive wheels mounted on the main body, a partitioning member mounted on the main body and defining a pressure reduction space in cooperation with the main body and a wall surface, and a vacuum pump for reducing the pressure of the pressure reduction space. The device can suction-adhere to the wall surface by the pressure of an ambient fluid acting on the main body owing to the difference in fluid pressure between the inside and outside of the pressure reduction space and move along the wall surface by the action of the moving member. The partitioning member has an outside wall portion extending from its one end to a contacting portion contacting the wall surface and an inside wall portion extending from the contacting portion to its other end. A stretchable and contractible portion is provided in at least one of the outside and inside wall portions, and the contacting portion moves toward and away from the wall surface by the stretching and contracting of the stretchable and contractible portion.

3 Claims, 4 Drawing Sheets

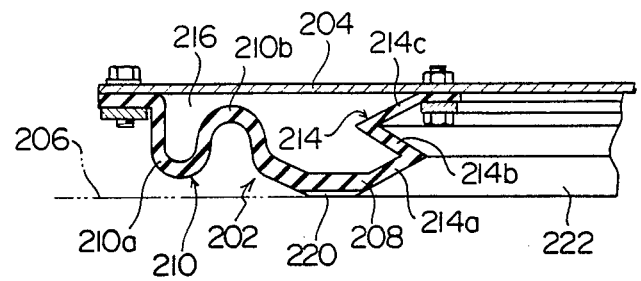
Fig. 5-A
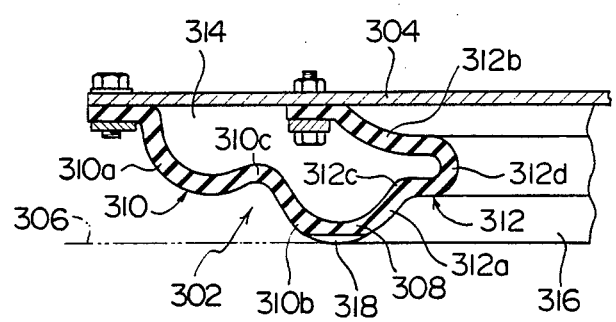
Fig. 5-B
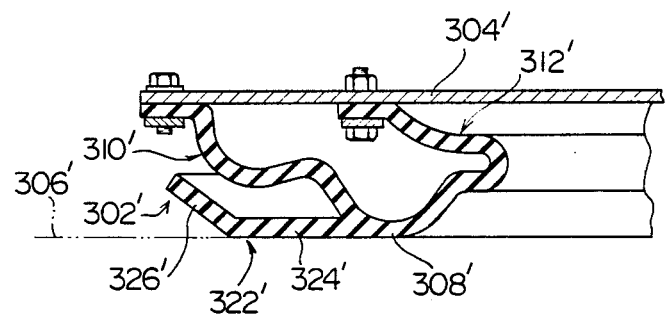
Fig. 5-C

DEVICE CAPABLE OF SUCTION-ADHERING TO A WALL SURFACE AND MOVING THEREALONG

FIELD OF THE INVENTION

This invention relates to a device capable of suction-adhering to a wall surface or the like by the pressure of an ambient fluid such as air or water and moving therealong.

DESCRIPTION OF THE PRIOR ART

An example of a device capable of suction-adhering to an inclined or substantially perpendicular wall surface in ships, buildings, etc. and moving therealong is disclosed, for example, in U.S. Pat. No. 4,095,378. Such a device comprises a main body, wheels as moving means mounted on the main body, a partitioning member connected to the main body and having its free end portion adapted to make contact with a wall surface, and vacuum creating means for discharging a fluid from a pressure reduction space defined by the main body, the wall surface and the partitioning member. When the vacuum creating means is energized in this device, the fluid within the pressure reduction space is discharged outside, and the pressure of the fluid acting on the main body of the device owing to the difference in fluid pressure between the inside and the outside of the pressure reduction space is transmitted to the wall surface via the wheel, and the fluid pressure causes the device to suction-adhere to the wall surface. When in this suction-adhering state, the wheel is rotated by driving means such as an electric motor, the action of the wheel causes the device to move along the wall surface.

The conventional device described above, however, has the following problems to be solved.

Firstly, the partitioning member in the conventional device is comprised of a plate-like member and connected at its one end portion to the main body of the device. Its other end portion is adapted to make contact with the wall surface. When the partitioning member is formed of a relatively flexible material, its free end portion can easily move toward and away from the wall surface following the raised and depressed parts of the wall surface. But when it gets on a relatively large protruding object on the wall surface, it tends to turn over inwardly. If the partitioning member is formed of a relatively rigid material, occurrence of its turn-over is reduced. Its free end portion, however, cannot follow the raised and depressed parts of the wall surface, and its ability to seal the space between the partitioning member and the wall surface is reduced.

Secondly, in the conventional device, the ground-contacting pressure of the partitioning member depends upon the difference in fluid pressure between the inside and outside of the pressure reduction space, and increases as the difference in fluid pressure between the inside and outside of the pressure reduction space increases. Larger ground-contacting pressures result in higher friction force between the partitioning member and the wall surface. This will consequently lead to the need for a larger driving power for moving the main body of the device, and also quicken wearing of the free end portion of the partitioning member (that portion which makes contact with the wall surface).

Thirdly, in the conventional device, the moving direction of its main body is changed by changing the rotating speed of a plurality of wheels (for example, the rotating speeds of a wheel disposed at a right portion and a wheel disposed at a left portion are varied from each other). Slippage therefore occurs between the wheels and the wall surface at the time of changing the moving direction, and will injure the wall surface.

SUMMARY OF THE INVENTION

It is a primary object of this invention to provide an excellent device in which a partitioning member follows the raised and depressed parts of a wall surface to give a sufficient sealing performance.

Another object of this invention is provide an excellent device in which the ground-contacting pressure of a partitioning member can be adjusted to a desired value substantially irrespective of the pressure of a pressure reduction space.

Still another object of this invention is to provide an excellent device in which the moving direction of its main body can be changed without causing inconveniences such as injury to a wall surface.

According to this invention, there is provided a device comprising a main body, moving means mounted on the main body, a partitioning member mounted on the main body and defining a pressure reduction space in cooperation with the main body of the device and a wall surface, and vacuum creating means for discharging a fluid from the pressure reduction space, said device being adapted to suction-adhere to the wall surface by the pressure of an ambient fluid acting on the main body of the device owing to the difference in fluid pressure between the inside and outside of the pressure reduction space and to move along the wall surface by the action of the moving means; wherein the partitioning member has an outside wall portion extending from one end of said member connected to the main body of the device to a contacting portion of said member which makes contact with the wall surface and an inside wall portion located inwardly of the outside wall portion and extending from said contacting portion to the other end of said member connected to the main body of the device, and a stretchable and contractible portion capable of stretching toward the wall surface and contracting away from it is provided in at least one of the outside wall portion and the inside wall portion.

BRIEF DESCRIPTION OF THE DRAWINGS

FIGS. 5—A, 5—B and 5—C are sectional views partly showing a first to a third modified embodiment of the partitioning member in the device of this invention.

DETAILED DESCRIPTION OF PREFERRED EMBODIMENTS

The invention will be described in detail with reference to the accompanying drawings.

Figure 1:
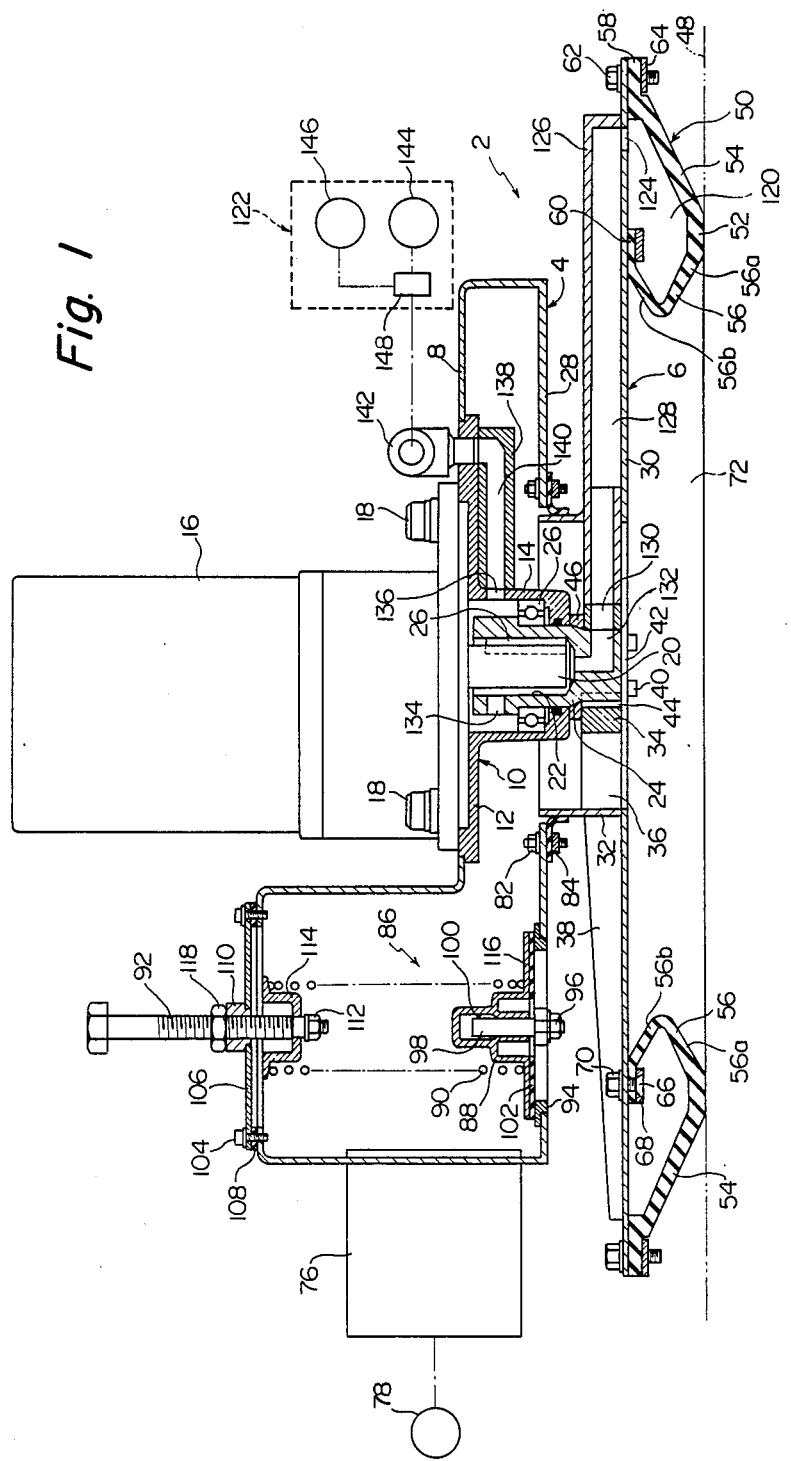
FIG. 1 is a sectional view showing one embodiment of the device in accordance with this invention.
Figure 2:
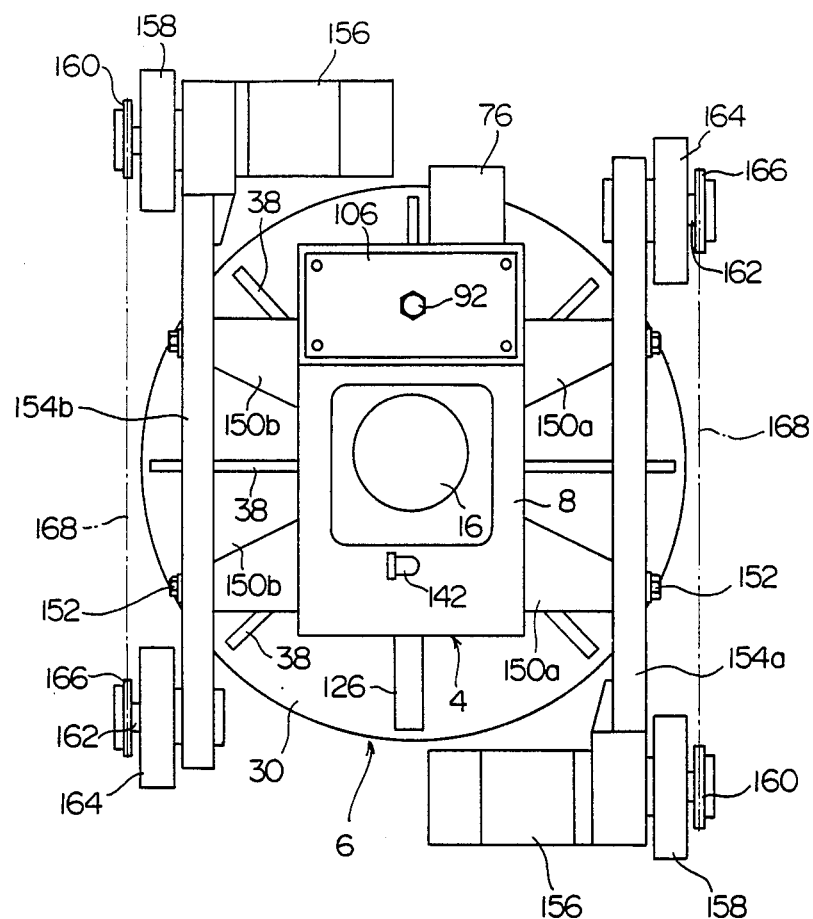
FIG. 2 is a top plan view of the device shown in FIG. 1.
Figure 3:
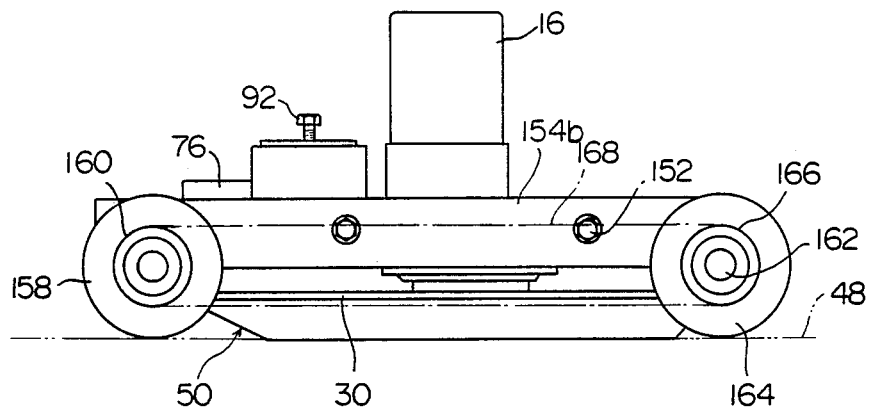
FIG. 3 is a side view of the device shown in FIG. 1.

With reference to FIGS. 1 to 3, mainly FIG. 1, the illustrated device has a main body shown generally at 2. The main body 2 is provided with a nearly rectangular parallelpipedal housing 4 and a rotating member 6 mounted rotatably on the housing 4. The left end portion in FIG. 1 of the housing 4 projects upwardly. The housing 4 is hollow, and communicates with a pressure reduction space to be described. A circular opening is formed in the upper wall 8 of the housing 4, and a supporting member 10 is fixed to the opening by welding or like means. The supporting member 10 has a disk-like main body portion 12 and a sleeve portion 14 projecting in sleeve form from one surface of the main body portion 12. An electric motor 16 constituting a driving source is secured to the outside surface of the main body portion 12 by a plurality of screws 18. The output shaft 20 of the electric motor 16 projects into the sleeve portion 14 through the opening formed in the main body portion 12 of the supporting member 10. Within the sleeve portion 14, a coupling member 24 having a receiving portion 22 defined therein is rotatably supported via a bearing member 26. The output shaft 20 projecting into the sleeve portion 14 is received in the receiving portion 22 of the coupling member 24, and drivingly linked to the coupling member 24 via a key member 26.

A circular opening is also formed nearly centrally in the lower wall 28 of the housing 4, and the rotating member 6 is disposed in this opening. The rotating member 6 is comprised of a circular plate 30 formed of a rigid or semirigid material such as a steel sheet, and a circular opening is formed in its central part. An annular flange 32 projecting toward the lower wall 28 of the housing 4 is provided in the inside edge portion of the circular plate 30, and connected by a plurality of radially extending linking portions 36 to an annular securing portion 34 disposed inwardly of the annular flange 32. A plurality of radially extending reinforcing members 38 are provided on the upper surface of the circular plate 30 (see FIG. 2 also). The rotating member 6 is secured to the coupling member 24 by mounting the annular securing portion 34 to the lower end portion of the coupling member 24 and fixing a plate 42 to its end surface by means of a screw 40. A key member 44 is interposed between the annular securing portion 34 and the coupling member 24 to connect them drivingly to each other. An annular spacer 46 is provided between the annular securing portion 34 and the sleeve portion 14 of the supporting member 10. Thus, when the electric motor 16 is energized, the rotating force of its output shaft 20 is transmitted to the annular securing portion 34 of the rotating member 6 via the key member 26, the coupling member 24 and the key member 44, whereby the rotating member 6 rotates relative to the housing 4.

A partitioning member 50 is attached to the outside edge portion of that surface of the circular plate 30 which faces a wall surface 48. The partitioning member 50 may be formed of a relatively flexible material such as polyurethane rubber or synthetic resins. As shown in FIG. 1, the partitioning member 50 has an outside wall portion 54 extending from its one end portion connected to the peripheral edge part of the circular plate 30 to its contacting portion 52 making contact with the wall surface 48 and an inside wall portion 56 inwardly of the outside wall portion 54 extending from the contacting portion 52 to its other end connected to the circular plate 30. It will be seen from FIGS. 1 and 3 that the partitioning member 50 is nearly annular in its entire shape, and its outside wall portion 54 defines an outer circumferential surface while its inside wall portion 56 defines an inner circumferential surface. In the illustrated embodiment, annular flanges 58 and 60 extending radially outwardly are provided integrally at the opposite ends of the partitioning member 50. The outside flange 58 is held between the circular plate 30 and an annular plate 64 by securing a plurality of bolts 62 to a fixing annular plate 64 through the circular plate 30 and the annular flange 58. The inside annular flange 60 is held between the circular plate 30 and an annular plate 68 by projecting a plurality of bolts 66 through the annular plate 68, the annular flange 60 and the circular plate 30 and securing nuts 70 to the projecting end portions of the bolts 66.

It is critical that in the device of this invention, a stretchable and contractible portion should be provided in at least one of the outside wall portion 54 and the inside wall portion 56 of the partitioning member 50. In the illustrated embodiment, the outside wall portion 54 extends inwardly from its one end connected to the circular plate 30 in a straight line in a direction approaching the wall surface 48. The inside wall portion 56 has a first inclined portion 56a extending inwardly in a straight line from the contacting portion 52 in a direction away from the wall surface 48 and a second inclined portion 56b extending outwardly from the first inclined portion 56a in a straight line in a direction away from the wall surface 48. The first and second inclined portions 56a and 56b constitute a bellows portion. In the illustrated embodiment, one flexed part exists between the first inclined portion 56a and the second inclined portion 56b. To increase the amount of stretching or contracting, two or more such flexed parts may be provided.

The partitioning member 50 defines a pressure reduction space 72 in cooperation with the main body 2 of the device (particularly, the rotating member 6) and the wall surface 48. The pressure reduction space 72 communicates with the housing 4 through the opening formed in the circular plate 30 and the opening defined by the annular flange 32, the annular securing portion 34 and the linking portion 36. A connecting tube portion 76 is provided in the left end wall in FIG. 1 of the housing 4 and connected to vacuum creating means 78 such as a vacuum pump via a flexible hose (not shown), for example. When the vacuum creating means 78 is energized, a fluid such as air in the pressure reduction space 72 is discharged outside through the housing 4 and the aforesaid hose (not shown) to reduce the pressure of the pressure reduction space 72. In the illustrated embodiment, an annular seal member 80 is disposed in order to prevent entry of the fluid through the opening formed in the lower wall 28 of the housing 4. The outer circumferential edge of the seal member 80 is held between the lower wall 28 and the annular plate 84 by securing a plurality of bolts 82 to a fixing annular plate 84. Its inner circumferential edge portion is kept in contact with the peripheral surface of the annular flange 32.

The pressure of the pressure reduction space 72 can be adjusted by pressure adjusting means 86 comprising a valve body 88, a biasing spring 90 for elastically biasing the valve body 88 toward a closing position and an adjusting screw 92 for adjusting a preload on the biasing spring 90. A circular opening is formed in the left end portion of the lower wall 28 of the housing 4. A valve seat member 94 having a plurality of fan-like openings formed in the circumferential direction is secured to the circular opening. A guide shaft 98 is mounted on the central part of the valve seat member 94 by means of a bolt 96. The guide shaft 98 extends toward the upper wall 8 within the housing 4. A receiving portion 100 is defined in the valve body 88, and by positioning the guide shaft 98 within the receiving portion 100, the valve body 88 is mounted so as to be free to move toward and away from the valve seat member 84. A rubber material 102 is bonded to that surface of the valve body 88 which makes contact with the valve seat member 94 in order to increase sealability. A rectangular opening is formed in the left end portion of the upper wall 8 of the housing 4, and a rectangular cover 106 is attached to the opening by means of a plurality of screws 104. Preferably, a seal member 108 is provided between the upper wall 8 and the cover 106. A screw fitting member 110 having an internally threaded hole is fixed to the central part of the cover 106, and the adjusting screw 92 is put on the screw fitting member 110. One end portion of the adjusting screw 92 projects into the housing 2 through the opening formed in the upper wall 8. A spring receiving member 114 is secured to the projecting end portion of the screw 92 by means of a nut 112. The biasing spring 90 is interposed between the spring receiving member 114 and a spring receiving portion 116 defined in the valve body 88. A compression load is exerted in advance on the biasing spring 90. Hence, this biasing spring 90 elastically biases the valve body 88 toward a closing position shown in FIG. 1 (at which the valve body 88 seats on the valve member 94). When the pressure of the pressure reduction space 72 abnormally decreases, the pressure of a fluid such as atmospheric air outside pushes the valve body 88 of the pressure adjusting means 86 upwardly in FIG. 1 against the force of the biasing spring 90, and the outside fluid flows into the housing 4 through the space between the valve body 88 and the valve seat member 94, thus preventing the abnormal reduction of the pressure of the pressure reduction space 72. Incidentally, when the adjusting screw 92 is turned in a predetermined direction (or a direction opposite to it) by loosening a lock nut 118, the spring receiving member 114 is moved downwardly (or upwardly) in FIG. 1 and accordingly, the pre-load on the biasing spring 90 becomes high (or low), and the pressure of the pressure reduction space 72 can be set at a lower (or higher) value.

A pressure adjusting space 120 is defined between the outside wall portion 54 and the inside wall portion 56 of the partitioning member 50. In the illustrated embodiment, the pressure adjusting space 120 is defined by the outside wall portion 54, the inside wall portion 56 and the peripheral edge of the circular plate 30, and connected to variable pressure setting means 122 via an opening 124 formed in the circular plate 30, a flow passage 128 defined by the circular plate 30 and a member 126, a through-hole 130 formed in the annular securing portion 34 of the rotating member 6, holes 132 and 134 formed in the coupling member 24, a space between the coupling member 24 and the supporting member 14, a hole 136 formed in the supporting member 14, flow passage 140 defined by a tube member 138 fixed to the supporting member 14, a flow passage defined by a connecting member 142 fastened to the supporting member 14 and a flow passage defined by a hose (not shown) connected to the connecting member 142. The variable pressure setting means 122 is comprised of a combination of vacuum creating means 144 such as a vacuum pump for discharging a fluid such as air from the pressure adjusting space 120, a pressurized fluid supply source 146 such as a compressor for supplying a pressurized fluid such as compressed air to the pressure adjusting space 120, and a switch valve 148 for connecting the vacuum creating means 144 or the pressurized fluid supply source 146 to the pressure adjusting space 120. When the switch valve 148 is held at a first position, the vacuum creating means 144 communicates with the pressure adjusting space 120. When it is held at a second position, the pressurized fluid supply source communicates with the pressure adjusting space 120.

With reference to FIGS. 2 and 3, a pair of auxiliary frames 150a and a pair of auxiliary frames 150b are fixed respectively to both side walls of the housing 4. A right frame 154a is mounted between the auxiliary frames 150a by means of a bolt 152, and a left frame 154b if mounted between the auxiliary frame 150b by means of a bolt 152. An electric motor 156 constituting driving source is mounted on one end portion of each of the right frame 154a and the left frame 154b. A wheel 158 and a sprocket 160 are mounted on the output shaft of the motor 156 so as to rotate as a unit. A rotating shaft 162 is rotatably mounted on the other end portion of each of the frames 154a and 154b via a bearing member (not shown), and a wheel 164 and a sprocket 166 are mounted on the rotating shaft 162 so as to rotate as a unit. The sprocket 160 and the sprocket 166 are drivingly connected via a chain 168. Hence, when each electric motor 156 is energized, the wheel 158 is rotated in a predetermined direction, and its rotating force is transmitted to the other wheel 164 via the sprocket 160, the chain 168 and the sprocket 166. Desirably, the electric motor 156 can be rotated both in a normal direction and in a reverse direction.

The operation and effect of the device described above will now be described in detail.

Energization of the vacuum creating means 78 discharges a fluid such as air in the pressure reduction space 72 outside through the housing 4 and the hose (not shown), and the pressure reduction space 72 is reduced in pressure. When the pressure of the pressure reduction space 72 decreases abnormally, the valve body 88 is opened to permit the outside fluid such as air to flow into the housing 4 through the valve seat member 94 and the valve body 88, and consequently, the pressure of the pressure reduction space 72 is maintained at a predetermined pressure set by the pressure adjusting means 86. When the pressure of the pressure reduction space 72 thus decreases, the pressure of an ambient fluid such as atmospheric air which acts on the main body 2 of the device (especially the rotating member 6 acting as a pressure receiving member) owing to the difference in fluid pressure between the inside and outside of the pressure reduction space 72 is transmitted to the wall surface 48 via the right frame 154a, the left frame 154b and the wheels 158 and 164. As a result, the main body 2 of the device suction-adheres to the wall surface 48 by the ambient fluid pressure.

When the vacuum creating means 144 in the variable pressure setting means 122 is energized and the switch valve 148 is held at the first position, the pressure adjusting space 120 of the partitioning member 50 communicates with the vacuum creating means 144 via the switch valve 148 and a fluid such as air in the pressure adjusting space 120 is discharged outside to reduce the pressure of the pressure adjusting space 120 to a desired value. The pressure of the pressure adjusting space 120 which greatly affects the ground-contacting pressure of the partitioning member 50 can be set as follows. When the pressure Pa of the pressure adjusting space 120 is set at a value lower than the outside pressure Po and higher than the pressure Pb of the pressure adjusting space 72 (Po<Pa<Pb), the fluid pressure of the pressure adjusting space 120 acting on the inside wall portion 56 of the partitioning member 50 owing to the difference in fluid pressure between the pressure adjusting space 120 and the pressure reduction space 72 produces a force tending toward the wall surface 48 which acts on the contacting portion 52. Furthermore, the outside fluid pressure acting on the outside wall portion 54 of the partitioning member 50 owing to the difference in fluid pressure between the outside and the pressure adjusting means 120 produces a force in a direction away from the wall surface 48 which acts on the contacting portion 52. Hence, the contacting portion 52 of the partitioning member 50 is pressed against the wall surface 48 by the difference between the force in a direction approaching the wall surface 48 and the force in a direction away from the wall surface 48. Thus, even when the fluid pressure of the pressure reduction space 72 is set at a relatively low value, the ground-contacting pressure of the contacting portion 52 can be lowered. In order to keep the contacting portion 52 of the partitioning member 50 from substantially leaving the wall surface 48, it is necessary to make the force in a direction approaching the wall surface 48 larger than the force in a direction away from the wall surface 48. It will be seen from the foregoing statement that while the pressure of the pressure reduction space 72 is maintained constant, the ground-contacting pressure of the contacting portion 52 of the partitioning member 50 can be adjusted by changing the pressure of the pressure adjusting space 120. When the pressure of the pressure adjusting space 120 is made close to the pressure of an outside fluid such as atmospheric air, the force in a direction away from the wall surface 48 decreases and the ground-contacting pressure of the contacting portion 52 becomes higher. On the other hand, when the pressure of the pressure adjusting space 120 is made close to the pressure of the reduction space 72, the force in a direction approaching the wall surface 48 is lowered and the ground-contacting pressure of the contacting portion 52 becomes lower.

When the electric motor 16 is energized in this suction-adhering state, the rotating member 6 is rotated relative to the housing 4 because the frictional force between the wall surface 48 and the wheels 158 and 164 is large. Thus, the contacting portion 52 of the partitioning member 50 rotates while being in contact with the wall surface 48, and the wall surface is cleaned by the action of the contacting portion 52. When the electric motor 156 is energized and rotated in a normal (or reverse) direction, the wheels 158 and 164 are rotated in a predetermined direction (or in a direction opposite to it). The main body 2 of the device cleans the wall surface 48 while moving to the left (or to the right) in FIG. 1 along the wall surface 48. When the main body 32 of the device so moves and the partitioning member 50 passes over a protruding object (or a depressed part) on the wall surface 48, the first inclined portion 56a and the second inclined portion 56b constituting the stretchable and contractible portion come closer to each other (or move apart from each other) and the inside wall portion contracts (or stretches) in a direction substantially perpendicular to the wall surface. Hence, the seal between the contacting portion 52 and the wall surface 48 does not break. Furthermore, since the inside wall portion 56 and the outside wall portion 54 are connected to the circular plate 30, the partitioning member 50 does not turn over inwardly even when it comes into contact with a relatively large protruding object on the wall surface. The partitioning member 50 can easily ride over the protruding object. Furthermore, since the stretchable and contractible portion is provided in the inside wall portion 56, the contacting portion 52 of the partitioning member 50 is displaced relatively greatly in a direction toward and away from the wall surface 48.

Surface treating means for blast cleaning, coating, sweeping, etc. of a wall surface in a ship, etc. may be separately provided instead of utilizing the partitioning member 50 as surface-treating means. In this alternative, too, it is preferred to rotate the partitioning member 50 as above during the movement of the main body 2 of the device. By so doing, the frictional force between the contacting portion 52 of the partitioning member 50 and the wall surface 48 can be decreased.

Figure 4:
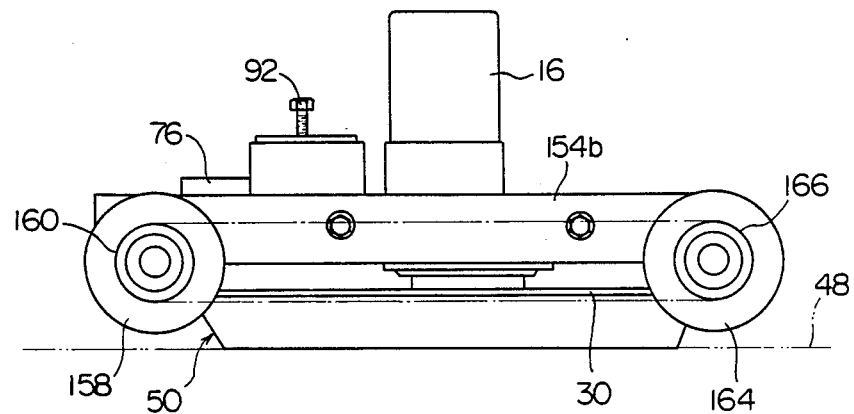
FIG. 4 is a side view showing the device of FIG. 1 in which at the time of changing its moving direction, a pressure adjusting space is pressurized.

When it is desired to change the moving direction of the main body 2 of the device, the electric motor 16 is deenergized, and then the pressurized fluid supply source 146 in the variable pressure setting means 122 is energized and at the same time, the switch valve 148 is held at the second position. As a result, the pressure adjusting space 120 of the partitioning member 50 communicates with the pressurized fluid supply source 146 via the switch valve 148 and a pressurized fluid such as compressed air is supplied to the pressure adjusting space 120 from the pressurized fluid supply source 146. It is possible to energize the vacuum creating means 144 and the pressurized fluid supply means 146 during the operation of the device, and to reduce or elevate the pressure of the pressure adjusting space 120 by operating the switch valve 148. When the pressurized fluid is supplied to the pressure adjusting space 120, the first inclined portion 56a and the second inclined portion 56b move apart from each other by the action of the pressurized fluid and the inside wall portion 56 stretches in a direction substantially perpendicular to the wall surface 48. As a result, the above stretching of the inside wall portion 56 pushes the rotating member 6 (as a unit with this, the housing 4, the right frame 154a and the left frame 154b) upwardly in a direction away from the wall surface 48 and the wheels 158 and 164 are moved away from the wall surface 48, as can be easily understood from a comparison of FIGS. 3 and 4. Thereafter, the electric motor 16 is slightly revolved. Since the partitioning member 50 is in contact with the wall surface 48, and the relative rotation of it is hampered, the housing 4, the right frame 154a, the left frame 154b and the wheels 158 and 164 are rotated, and the moving direction of the main body 2 of the device can be changed. Accordingly, the moving direction of the main body 2 of the device is changed by the rotation of the housing 4 (and the wheels 158 and 164 mounted on it) to the relative to the partitioning member 50. Hence, no inconvenience such as injury to the wall surface 48 occurs at the time of changing the moving direction of the device. After the moving direction is changed, the switch valve 148 is held at the first position, the pressure of the pressure adjusting space 120 is reduced to a desired pressure, and the rotating member 6 is rotated by energizing the electric motor 16. Thus, the operation of cleaning the wall surface 48 is resumed.

It will be easily seen that the device described above may be used broadly not only in a gas such as atmospheric air but also in a liquid such as water or sea water.

In the illustrated embodiment, the stretchable and contractible portion is provided in the inside wall portion of the partitioning member. Alternatively, it may be provided in the outside wall portion. Furthermore, as shown in FIGS. 5—A to 5—C, the stretchable and contractible portion may be provided both in the inside and outside wall portions.

In FIG. 5—A showing part of a first modified embodiment of the partitioning member, the illustrated partitioning member 202 which may be formed of, for example, polyurethane rubber has an outside wall portion 210 extending from its one end connected to the peripheral edge of a circular plate 204 to a contacting portion 208 contacting a wall surface 206 and an inside wall portion 214 located inwardly of the outside wall portion 210 and extending from the contacting portion 208 to its other end connected to the circular plate 204, and a pressure adjusting space 216 is defined between the outside wall portion 210 and the inside wall portion 214. The outside portion 210 has a first curved portion 210a projecting in semicircular form in a direction approaching the wall surface 206 and a second curved portion 210b following the first curved portion 210a and projecting in semicircular form in a direction away from the wall surface 206. The first curved portion 210a and the second curved portion 210b constitute a bellows portion functioning as a stretchable and contractible portion. The inside wall portion 214 has a first inclined portion 214a extending inwardly in a direction away from the wall surface 206, a second inclined portion 214b following the first inclined portion 214a and extending inclinedly outwardly in a direction away from the wall surface 206, and a third inclined portion 214c following the second inclined portion 214b and extending inclinedly inwardly in a direction away from the wall surface 206. The first to third inclined portions 214a, 214b and 214c constitute a bellows portion functioning as a stretchable and contractible portion. A groove 220 for communication between the outside and the pressure reduction space 218 is formed in the contacting portion 208 of the partitioning member 202. A plurality of such grooves 220 may be provided in circumferentially spaced relationship on that surface of the contacting portion 208 which makes contact with the wall surface 206.

Since the bellows portion as the stretchable and contractible portion is provided both in the outside wall portion 210 and the inside wall portion 214 in this first modified embodiment of the partitioning member, this partitioning member 202 can move while following the raised and depressed portions of the wall surface 206 more than the partitioning member depicted in FIGS. 1 to 3. The grooves 220 formed in the contacting portion 208 act effectively on the wall surface 206 during the rotation of the partitioning member 50 and increase the cleaning effect of the wall surface 206. Since the fluid always flows through the grooves 220 when the device is suction-adhering to the wall surface 206, dust, dirt, etc. occurring during the cleaning operation are carried on the flow of the fluid and collected in the pressure reduction space 222. Hence, scattering of the dust, dirt, etc. outside may be eliminated.

FIG. 5—B shows a second modified embodiment of the partitioning member. The illustrated partitioning member 320 has an outside wall portion 310 extending from its one end connected to the peripheral edge of a circular plate 304 to a contacting portion 308 contacting a wall surface 306 and an inside wall portion 312 located inwardly of the outside wall portion 310 and extending from the contacting portion 308 to its other end connected to the circular plate 304, and a pressure adjusting space 314 is defined between the outside wall portion 310 and the inside wall portion 312. The outside wall portion 310 includes a first and a second curved portion 310a and 310b projecting in a relatively small curvature toward the wall surface 306 and a third curved portion 310c projecting at a relatively large curvature in a direction away from the wall surface 306. The third curved portion 310c existing between the first and second curved portions 310a and 310b mainly constitutes a bellows portion functioning as a stretchable and contractible portion. The inside wall portion 312 has a first curved portion 312a and a second curved portion 312b curving at a relatively small curvature and a third curved portion 312c and a fourth curved portion 312d curving at a relatively large curvature. The fourth curved portion 312d projecting inwardly in nearly semicircular form mainly constitutes a bellows portion functioning as a stretchable and contractible portion. Furthermore, a plurality of circumferentially spaced grooves 318 (only one of which is shown in FIG. 5—B) for communication between the outside and the pressure reduction space 316 are formed in the contacting portion 308 of the partitioning member 302.

The partitioning member 302 in the second modified embodiment may be used in place of the partitioning member shown in FIGS. 1 to 3. It achieves substantially the same effect as the partitioning member of the first modified embodiment shown in FIG. 5—A although there is some difference in shape.

In the modified embodiments shown in FIGS. 5—A and 5—B, grooves are formed in the contacting portion of the partitioning member. Instead of providing grooves, it is possible to attach an abrasive member having an abrasive disposed on its surface to the contacting portion. In this arrangement, the abrasive acts on the wall surface to clean it efficiently. Furthermore, since the outside fluid flows into the pressure reduction space through the spaces among the abrasive particles, the dust, dirt, etc. occurring at the time of cleaning can be collected in the pressure reduction space by the flow of the fluid.

FIG. 5—C shows a third modified embodiment of the partitioning member. In the third modified embodiment, a lip portion is provided in the contacting portion of the partitioning member.

In FIG. 5—C, an outwardly extending lip portion 322' is provided in the contacting portion 308' of the partitioning member 302' which may be formed of, for example, polyurethane rubber. The lip portion 322' may be provided on substantially the entire circumference of the contacting portion 308'. As shown, it may be formed integrally in the contacting portion 308'. Alternatively, it may be formed as a separate piece and attached to the contacting portion 308'. The lip portion 222' has a main portion 324' extending outwardly from the contacting portion 308' along the wall surface 306' and an extension 326' extending further outwardly from the main portion 324' in a direction away from the wall surface 306'. Otherwise, the structure of the partitioning member 302 in the third modified embodiment is substantially the same as that shown in FIG. 5—B excepting the grooves.

The basic form of the third modified embodiment is substantially the same as the second modified embodiment shown in FIG. 5—B. Hence, the outside wall portion 310' and the inside wall portion 312' stretch and contract in a direction toward and away from the wall surface 306', and the contacting portion 308' of the partitioning member 302' moves following the raised and depressed parts of the wall surface 306'. In addition, since the lip portion 322' (especially, the main portion 324') is provided in the contacting portion 308', the lip portion 322' also moves toward and away from the wall surface 306' while following the raised and depressed parts of the wall surface 306'. Hence, sealability between the partitioning member 302' and the wall surface 306' is further enhanced. Furthermore, since the extension 326' is provided following the main portion 324', the lip portion 322' can easily ride over raised and depressed parts of the wall surface 306'.

In the third modified embodiment, too, grooves may be formed, or an abrasive material may be attached, in order to increase the cleaning effect of the wall surface. In this case, it is preferred to provide the grooves or the abrasive material in an area ranging from the contacting portion of the partitioning member to the main portion of the lip portion.

While the present invention has been described with reference to one specific embodiment of the device constructed in accordance with this invention, it should be understood that the invention is not limited to this specific embodiment, and various changes and modifications are possible without departing from the scope of the invention described and claimed herein.

For example, in the illustrated embodiment, the ground-contacting pressure of the partitioning member is reduced by setting the pressure of the pressure adjusting space defined in the partitioning member at a value lower than the outside pressure. As required, the ground-contacting pressure of the partitioning member may be increased by making the pressure of the pressure adjusting space higher than the outside pressure.

What is claimed is:

1. A device comprising a main body, moving means mounted on the main body, a partitioning member mounted on the main body and defining a pressure reduction space in cooperation with the main body of the device and a wall surface, and vacuum creating means for discharging a fluid from the pressure reduction space, said device being adapted to suction-adhere to the wall surface by the pressure of an ambient fluid acting on the main body of the device owing to the difference in fluid pressure between the inside and outside of the pressure reduction space and to move along the wall surface by the action of the moving means; wherein the partitioning member has an outside wall portion extending from one end of said member connected to the main body of the device to a contacting portion of said member which makes contact with the wall surface, and an inside wall portion located inwardly of the outside wall portion and extending from said contacting portion to the other end of said member connected to the main body of the device, a pressure adjusting space is defined by the outside wall portion and the inside wall portion, a pressurized fluid supply source is provided for pressurizing the pressure adjusting space, means is provided for feeding a pressurized fluid from the pressurized fluid supply source to the pressure adjusting space to stretch the partitioning member at the time of changing the moving direction of the main body of the device to move the moving means away from the wall surface so that the main body is supported by the partitioning member while the moving direction is changed.

2. The device of claim 1 having a vacuum creating means for forming vacuum in the pressure adjusting space so that the pressure adjusting space is reduced in pressure by the action of the vacuum creating means until pressurized fluid is fed to the pressure adjusting space when the moving direction of the main body is changed.

3. The device of claim 1 wherein the main body includes a main body portion and a rotating member rotatably mounted on the main body portion; the moving means is mounted on the main body portion; the partitioning member is mounted on the rotating member; a driving source for rotating the rotating member relative to the main body portion is further provided; rotation of the main body portion relative to the wall normally being hampered by contact of the moving means with the wall so that the driving source rotates the partitioning member relative to the wall; said device, at the time its moving direction is changed, having rotation of the partitioning member relative to the wall hampered by the contact of the partitioning member with the wall so that the driving source rotates the main body portion relative to the wall.

* * * * *